(12) United States Patent
Hasting et al.

(10) Patent No.: US 10,247,043 B2
(45) Date of Patent: Apr. 2, 2019

(54) DUCTED COWL SUPPORT FOR A GAS TURBINE ENGINE

(71) Applicant: General Electric Company, Schenectady, NY (US)

(72) Inventors: William Howard Hasting, Cincinnati, OH (US); David Edward Dale, Cincinnati, OH (US); Jared Matthew Wolfe, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 14/966,390

(22) Filed: Dec. 11, 2015

(65) Prior Publication Data

US 2016/0186613 A1 Jun. 30, 2016

Related U.S. Application Data

(60) Provisional application No. 62/098,878, filed on Dec. 31, 2014.

(51) Int. Cl.
*F01D 25/28* (2006.01)
*F02K 3/075* (2006.01)
*F02C 3/13* (2006.01)

(52) U.S. Cl.
CPC .............. *F01D 25/28* (2013.01); *F02C 3/13* (2013.01); *F02K 3/075* (2013.01); *F05D 2220/32* (2013.01); *F05D 2230/53* (2013.01); *F05D 2260/30* (2013.01)

(58) Field of Classification Search
CPC .... F01D 25/28; F02C 3/13; F02C 8/18; F02C 9/18; F02C 7/05; F02C 7/052; F02K 3/075
See application file for complete search history.

(56) References Cited

U.S. PATENT DOCUMENTS

| 5,581,054 A | 12/1996 | Anderson et al. |
| 5,598,329 A | 1/1997 | Niemann |
| 8,651,809 B2 * | 2/2014 | Ballard, Jr. ........... F01D 25/243 415/182.1 |
| 2006/0056957 A1 | 3/2006 | Dong et al. |
| 2006/0277919 A1 | 12/2006 | Martensson et al. |
| 2008/0193279 A1 | 8/2008 | Albert et al. |

(Continued)

FOREIGN PATENT DOCUMENTS

| CN | 101627144 A | 1/2010 |
| EP | 0663632 A1 | 7/1995 |
| EP | 2497908 A2 | 9/2012 |

(Continued)

OTHER PUBLICATIONS

Unofficial English translation of Chinese Office Action issued in connection with corresponding CN Application No. 201511014246.5 dated Jan. 18, 2017.

(Continued)

*Primary Examiner* — Justin Seabe
*Assistant Examiner* — Sabbir Hasan
(74) *Attorney, Agent, or Firm* — General Electric Company; Pamela Kachur

(57) ABSTRACT

A ducted cowl support includes an annular structure configured to be mounted to an annular turbine engine frame and including one or more bypass ducts integrally formed therein.

19 Claims, 4 Drawing Sheets

(56) References Cited

U.S. PATENT DOCUMENTS

2010/0080889 A1    4/2010  Hardy et al.
2012/0308369 A1   12/2012  Maheshwari et al.

FOREIGN PATENT DOCUMENTS

| FR | 2961251 A1 | * | 12/2011 | ........... F01D 17/105 |
|----|------------|---|---------|-------------------------|
| JP | 06280614 A |   | 10/1994 |                         |
| JP | 2002275613 A |   | 9/2002 |                         |
| JP | 2006083858 A |   | 3/2006 |                         |
| JP | 2008531914 A |   | 8/2008 |                         |
| JP | 2012251550 A |   | 12/2012 |                        |
| WO | 2006021437 A1 |   | 3/2006 |                        |

OTHER PUBLICATIONS

Unofficial English translation of Japanese Office Action issued in connection with corresponding JP Application No. 2015250814 dated Feb. 7, 2017.
European Search Report and Opinion issued in connection with corresponding EP Application No. 15200690.4 dated May 24, 2016.

* cited by examiner

DUCTED COWL SUPPORT FOR A GAS TURBINE ENGINE

CROSS-REFERENCE TO RELATED APPLICATION(S)

This non-provisional application claims the benefit of priority under 35 U.S.C. § 119(e) to U.S. Provisional Patent Application No. 62/098,878, entitled "DUCTED COWL SUPPORT FOR A GAS TURBINE ENGINE", filed Dec. 31, 2014, which is herein incorporated in its entirety by reference.

BACKGROUND OF THE INVENTION

This invention relates generally to stationary structures in gas turbine engines, and more particularly to support frames in such engines.

A typical turbofan engine includes in serial flow communication a fan, a low pressure compressor or "booster", a high pressure compressor ("HPC"), a combustor, a high pressure turbine ("HPT"), and a low pressure turbine ("LPT"), with the HPT driving the HPC, and the LPT driving both the fan and the booster.

The rotating components of a gas turbine engine are supported by bearings mounted in one or more structural frames. The frames typically take the form of an inner hub connected to an outer casing by an array of radially extending airfoil-shaped struts. Typical turbofan engines have a fan hub frame ("FHF") just aft of the fan.

Conventional turbofan engines often incorporate a variable bleed valve ("VBV") system for controlling booster compressor stall margin. The VBV system includes one or more bleed valves mounted within the fan hub frame. The valves are open during low power operation of the engine, such as at idle, for bleeding a portion of the compressed air. The bleed valves are closed at high power operation of the engine, such as during cruise or takeoff, since bleeding is no longer required. When the valves are open, air is passed from the booster flowpath through the fan hub frame and into a bypass duct.

In prior art turbofan engines the fan hub frame area includes, in addition to the fan hub frame itself, numerous attached components such as separate VBV ducts to direct the bypass flow, fire-resistant fire blankets to protect the fan hub frame, and cowl supports. While effective, these structures increase the weight, complexity, and cost of the engine.

Accordingly, there remains a need for a ducted cowl support which provides structural support and a fluid bypass flowpath.

BRIEF DESCRIPTION OF THE INVENTION

The technology described herein provides a ducted cowl support includes an annular structure configured to be mounted to an annular turbine engine frame and including one or more bypass ducts integrally formed therein.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
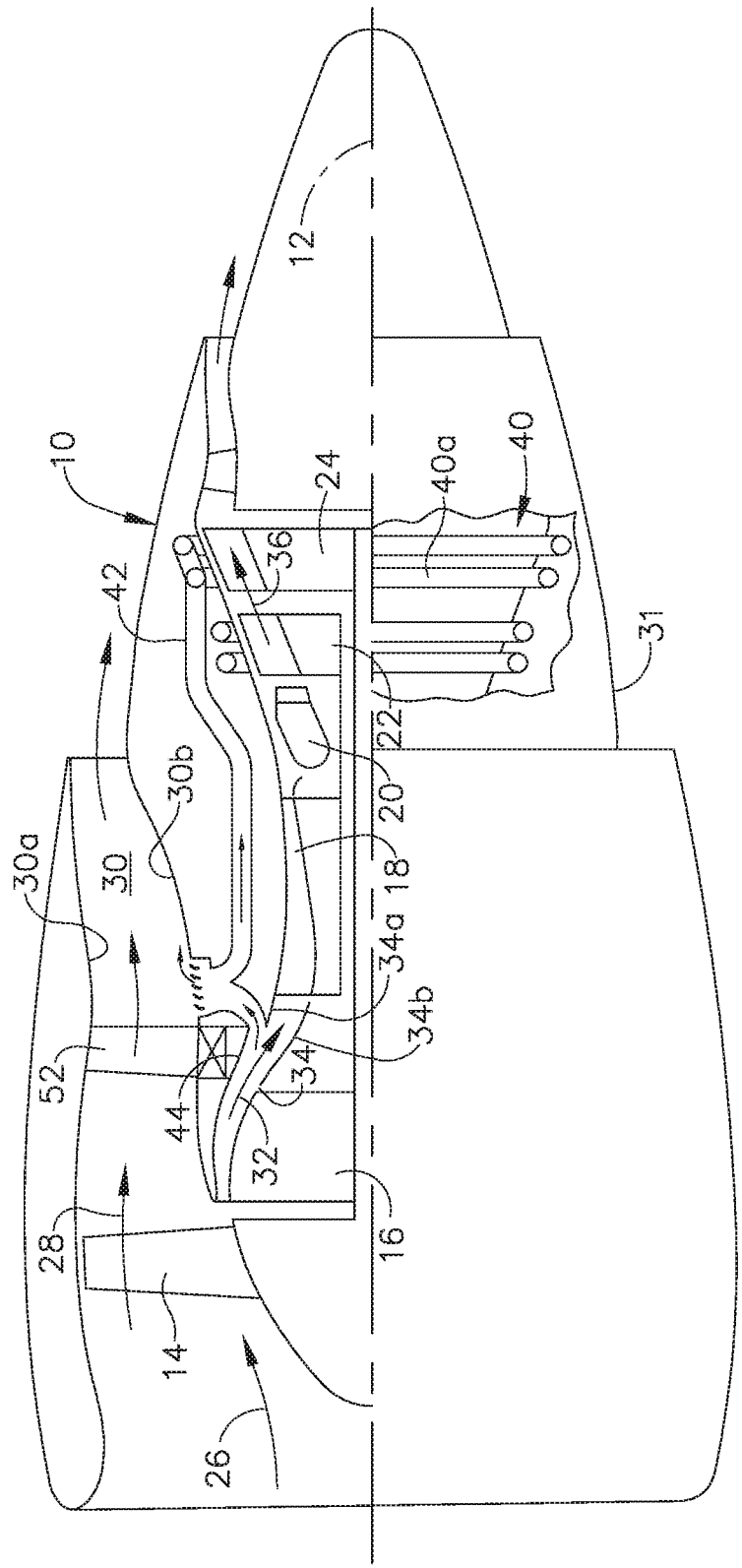
FIG. 1 is a partially-sectioned, schematic view of a gas turbine engine incorporating a cowl support constructed according to an aspect of the present invention.

Referring to the drawings wherein identical reference numerals denote the same elements throughout the various views, FIG. 1 depicts a schematic, partially-sectioned view of an exemplary gas turbine engine 10 having a longitudinal, axial centerline axis 12.

It is noted that, as used herein, the term "axial" or "longitudinal" refers to a direction parallel to the centerline axis 12 described above, while "radial" refers to a direction perpendicular to the axial direction, and "tangential" or "circumferential" refers to a direction mutually perpendicular to the axial and tangential directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow 26 in FIG. 1. These directional terms are used merely for convenience in description and do not require a particular orientation of the structures described thereby.

The engine 10 includes in serial flow communication a fan 14, a low pressure compressor or "booster" 16, a high pressure compressor 18, a combustor 20, a high pressure turbine 22, and a low pressure turbine 24 all disposed coaxially about the centerline axis 12. Collectively the HPC 18, combustor 20, and HPT 22 are referred to as a "gas generator" or "core". Collectively, the fan 14, booster 16, and low pressure turbine 24 are referred to as a "low pressure system". The high pressure turbine 22 conventionally drives the high pressure compressor 18, and the low pressure turbine 24 conventionally drives both the fan 14 and the booster 16.

Together, the core and low pressure systems are operable in a known manner to generate a primary or core flow as well as a fan flow or bypass flow. While the illustrated engine 10 is a high-bypass turbofan engine, the principles described herein are equally applicable to other types of turbine engines that include stationary frames The fan 14 receives ambient air 26 and initially pressurizes it to form pressurized fan air 28. The fan 14 is disposed upstream of an annular fan bypass duct 30 through which is channeled an outer portion of the fan air 28, with an inner portion of the fan air 28 being channeled into the booster 16. The bypass duct 30 includes radially spaced apart outer and inner annular walls 30a and 30b, respectively. The inner wall 30b is defined by a core cowl 31 which surrounds the core.

The fan air channeled into the booster 16 is further compressed therein for forming compressed air 32 which is further channeled from the booster 16 and through an annular compressor core duct 34 disposed downstream from the booster 16 and upstream of the high pressure compressor 18. The core duct 34 includes radially outer and inner annular walls 34a and 34b, respectively.

The compressed air 32 is further compressed in the high pressure compressor 18 and is then channeled to the combustor 20 wherein it is conventionally mixed with fuel and ignited for generating combustion gases 36 which are channeled through the high pressure turbine 22 and the low pressure turbine 24 which extract energy therefrom. The high pressure turbine 22 is disposed directly downstream from the combustor 20.

The low pressure turbine 24 is disposed directly downstream of the high pressure turbine 22 and immediately downstream of the compressors 16 and 18 and may include a passive blade-tip clearance control system 40 provided with cooling airflow. The clearance control system 40 itself is of a known type and includes one or more annular tubes 40a surrounding the low pressure turbine 24 for impinging cooling air on the conventional shrouds surrounding the blade tips for controlling the clearances therebetween during operation of the engine 10. The system 40 receives cooling air through a feed pipe 42 which communicates with the booster flowpath. More specifically, the core duct 34 includes a plurality of variable bleed valves 44 in its outer wall 34a disposed between the booster 16 and the high pressure compressor 18. Means (not shown) such as an actuator are provided for selectively positioning the bleed valve 44 in open or closed positions.

Figure 2:
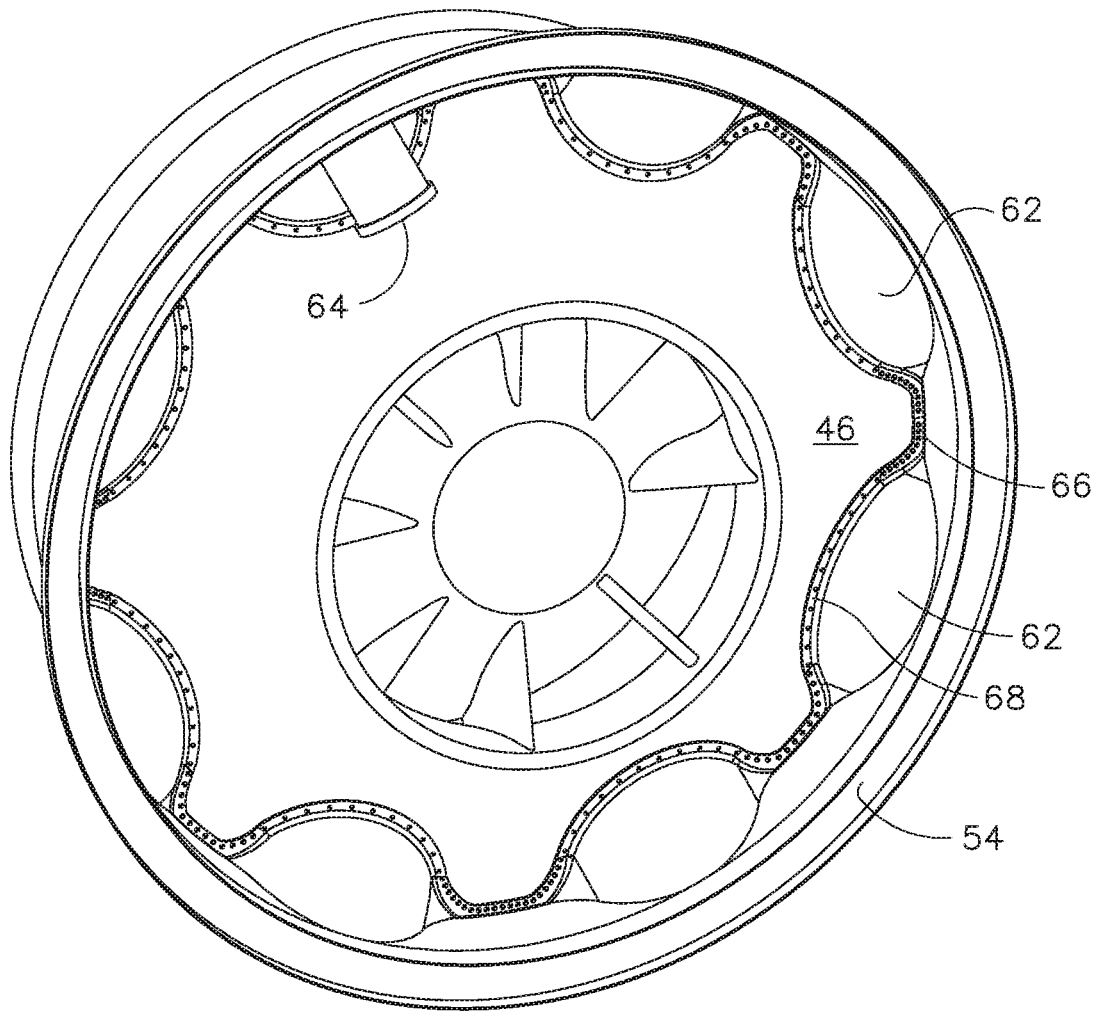
FIG. 2 is a schematic perspective view one embodiment of the cowl support of FIG. 1, attached to a fan hub frame.
Figure 3:
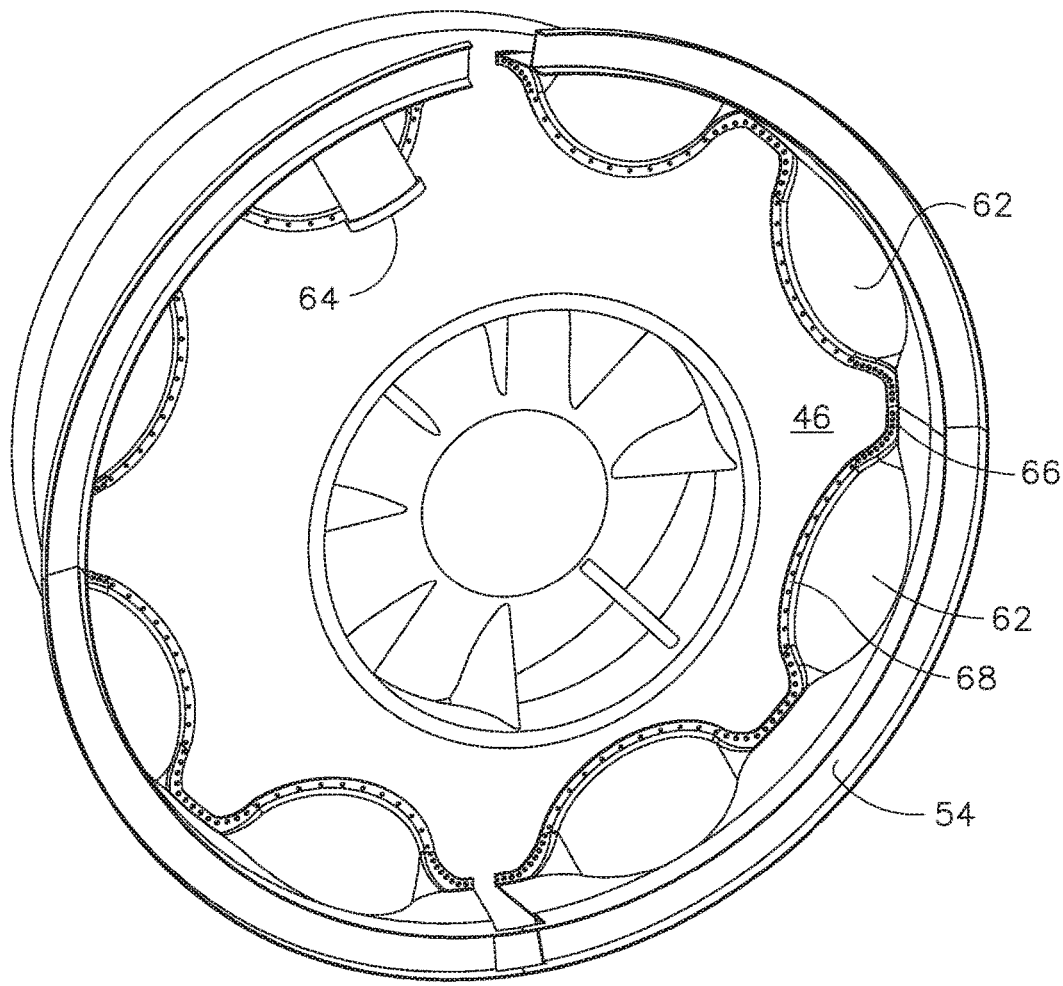
FIG. 3 is a schematic perspective view of another embodiment of the cowl support of FIG. 1.
Figure 4:
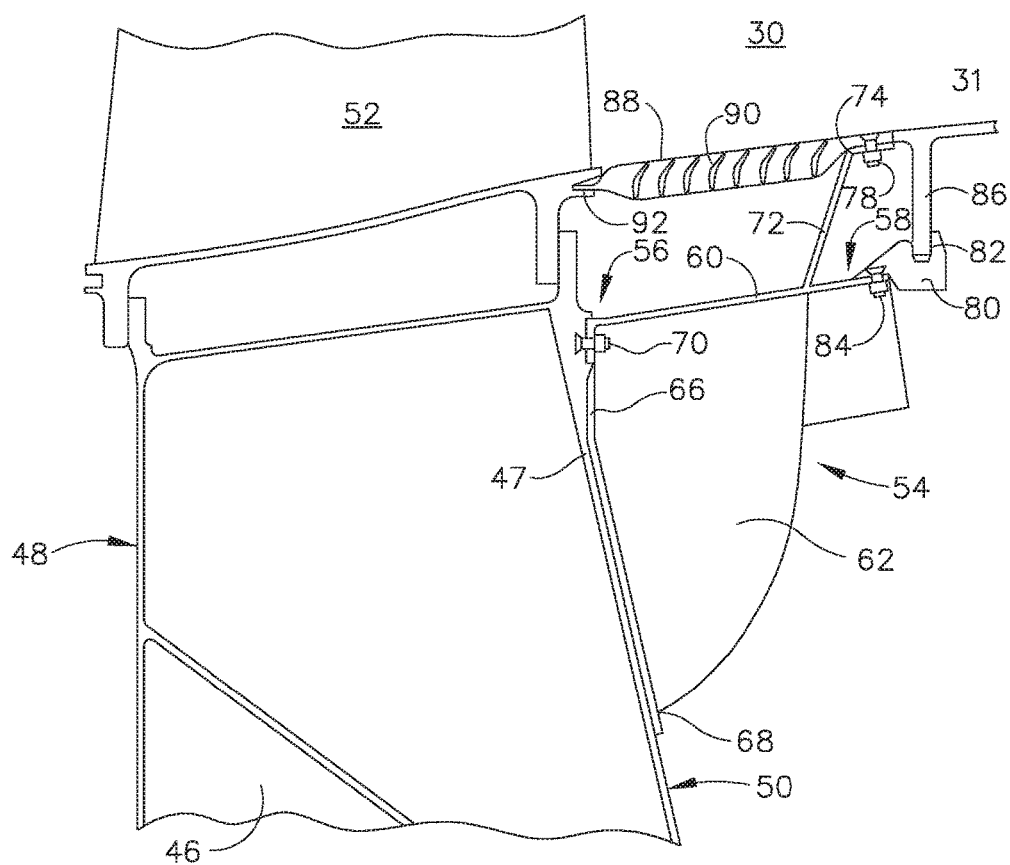
FIG. 4 is a cross-sectional view of the cowl support of FIG. 3.

Referring to FIGS. 2-4, the engine 10 includes an annular fan hub frame 46 disposed axially between the booster 16 and the high pressure compressor 18. It is an annular structure with forward and aft faces 48 and 50, respectively, and an annular array of fan struts 52 extend radially outward therefrom to the outer wall 30a of the bypass duct 30.

A cowl support 54 is mounted to the aft end of the fan hub frame 46. As assembled, the cowl support 54 is a complete annular structure. It may be manufactured as a single 360-degree ring, as shown in FIG. 2, or it may comprise two or more arcuate segments which are assembled to form a complete annulus, as shown in FIG. 3. The cowl support 54 has a forward end 56 which abuts the aft face 50 of the fan hub frame 46, and an aft end 58. The structure of the cowl support 54 includes a peripheral wall 60 which is generally cylindrical or frustoconical and which is relatively thin compared to the overall diameter of the cowl support 54. The peripheral wall 60 incorporates an annular array of integral or unitary bypass ducts 62 formed therein. Generally, each bypass duct 62 defines a convex bulge (viewed aft looking forward) which, when disposed abutting the fan hub frame 46, forms an air flow passageway. (The fan hub frame 46 includes a plurality of openings 47 formed around its periphery. Each opening 47 mates with one of the bypass ducts 62). The bypass ducts 62 may be simply-curved (i.e. part-tubular) or compound-curved (i.e. part spherical). One or more of the bypass ducts 62 may include an integral clearance control take-off duct 64, which is coupled to the feed pipe 42 shown in FIG. 1.

A generally radially-oriented forward flange 66 is disposed at the forward end 56 of the cowl support 54. Its path spans the spaces between the bypass ducts 62, and follows the inner edge 68 of each bypass duct 62. The forward flange 66 includes a plurality of spaced-apart flange holes which may accept fasteners 70 such as rivets, screws, or bolts to secure the cowl support 54 to the fan hub frame 46.

An annular, generally frustoconical aft skirt 72 extends radially outward from the peripheral wall 60, near the aft end 58 of the cowl support 54. A generally axially-oriented annular aft flange 74 is disposed at the distal end 76 of the aft skirt 72 and includes a plurality of spaced-apart flange holes which may accept fasteners 78 such as rivets, screws, or bolts.

The cowl support 54 may be constructed from a suitable material which is rigid and fire-resistant. Non-limiting examples of suitable materials include metal alloys or composite materials, such as an epoxy matrix with carbon fibers embedded therein. The cowl support 54 may be cast, forged, molded, machined from billet, or built up from individual components which are then bonded together, for example by welding or brazing. Collectively, the fan hub frame 46 and the cowl support 54 define a firewall, that is, their materials and configuration are selected to resist fire penetration according to relevant engineering or regulatory standards.

An annular V-groove flange 80 is disposed at the aft end 58 of the cowl support 54. As its name implies, the V-groove flange 80 includes a generally V-shaped, radially-outward-facing groove 82. It may be attached to the peripheral wall 60 with fasteners 84 such as rivets, screws, or bolts, so that it may be easily replaced when worn. The V-groove flange 80 may be constructed from metal or composite material as described above. Alternatively, the V-groove flange 80 may be of integral or unitary construction with the remainder of the cowl support 54.

The core cowl 31 described above has a downturned flange 86 at its forward end, or other suitable connecting structure. This flange 86 is received in the V-shaped groove 82, forming a mechanical connection between the core cowl 31 and the cowl support 54.

In order to discharge bleed air from the core duct 34 and into the bypass duct 30, a plurality of circumferentially spaced apart bleed vents 88 are provided. Each of the bleed vents 88 includes a plurality of axially spaced apart louvers 90 inclined in a downstream direction for injecting bleed air from the bypass valves 44 at an acute angle downstream into the bypass duct 30 for reducing mixing losses with the fan air 28. The forward end of each bleed vent 88 is received in an annular groove 92 in the fan strut 52, and the aft end of each bleed vent 88 is coupled to the aft flange 74 of the cowl support 54 via the fasteners 78.

The cowl support 54 is an integral, unitary, or monolithic structure that takes the place of prior art VBV bleed ducts and cowl support. It structurally supports the core cowl 31. It provides fluid connectivity from the booster flowpath to the bypass duct 30, provides a bleed point for clearance control air flow, and forms the firewall of the engine 10.

The cowl support 53 combines the functionality of multiple existing parts as compared to prior art designs. It is expected to save significant weight, eliminate extraneous piece parts (including fire blankets), and to simplify packaging and assembly. Depending on the particular application, it may represent a cost reduction as compared to the prior art structures it replaces.

The foregoing has described a ducted cowl support for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A ducted cowl support, comprising an annular structure configured to be mounted to an annular turbine engine frame and including one or more bypass ducts integrally formed therein, the ducted cowl support having a forward end and an aft end and further including a forward flange disposed at the forward end of the ducted cowl support, a peripheral wall extending aft from the forward flange to the aft end of the cowl support, an annular, generally frustoconical aft skirt extending radially outward from the peripheral wall near the aft end of the ducted cowl support and a generally axially-oriented annular aft flange disposed at a distal end of the aft skirt.

2. The ducted cowl support of claim 1 wherein the bypass ducts comprise convex bulges that mate with openings formed in the turbine engine frame to cooperatively define flow passages.

3. The ducted cowl support of claim 2 wherein the forward flange extends around the peripheral wall and the convex bulges.

4. The ducted cowl support of claim 1 including an annular V-groove flange disposed at the aft end of the cowl support, having a V-shaped groove formed therein.

5. The ducted cowl support of claim 4 wherein the V-groove flange is integral with the peripheral wall.

6. The ducted cowl support of claim 4 in combination with an annular fan hub frame and a core cowl having a flange received in the V-shaped groove.

7. The ducted cowl support of claim 1 combined with a fan hub frame so as to define a firewall.

8. The ducted cowl support of claim 1 wherein the annular structure is metallic.

9. The ducted cowl support of claim 1 wherein the annular structure is composite.

10. The ducted cowl support of claim 1 wherein the annular structure is manufactured as a single 360-degree ring.

11. The ducted cowl support of claim 1 wherein the annular structure comprises two or more arcuate segments which are assembled to form a complete annulus.

12. A ducted cowl support, comprising an annular structure configured to be mounted to an annular turbine engine frame and including one or more bypass ducts integrally formed therein, the ducted cowl support having a forward end and an aft end and further including a forward flange disposed at the forward end of the ducted cowl support, a generally cylindrical peripheral wall extending aft from the forward flange to the aft end of the cowl support, an annular, generally frustoconical aft skirt extending radially outward from the peripheral wall near the aft end of the cowl support, and an annular aft flange extending outwardly from a distal end of the aft skirt, and further including an annular V-groove flange connected to the peripheral wall at the aft end of the cowl support, having a V-shaped groove formed therein, wherein the annular structure comprises two or more arcuate segments which are assembled to form a complete annulus.

13. The ducted cowl support of claim 12 wherein the bypass ducts comprise convex bulges that mate with openings formed in the turbine engine frame to cooperatively define flow passages.

14. The ducted cowl support of claim 13 wherein the forward flange extends around the peripheral wall and the convex bulges.

15. The ducted cowl support of claim 12 wherein the V-groove flange is integral with the peripheral wall.

16. The ducted cowl support of claim 12 in combination with an annular fan hub frame and a core cowl having a flange received in the V-shaped groove.

17. The ducted cowl support of claim 12 combined with a fan hub frame so as to define a firewall.

18. The ducted cowl support of claim 12 wherein the annular structure is metallic.

19. The ducted cowl support of claim 12 wherein the annular structure is composite.

* * * * *